United States Patent [19]

Rogers, Jr. et al.

[11] 4,364,584
[45] Dec. 21, 1982

[54] JUNCTION RING FOR CONTINUOUS-LOOP PASSIVE SEAT BELT SYSTEM

[75] Inventors: Lloyd W. Rogers, Jr., Utica; James A. Winnale, Warren, both of Mich.

[73] Assignee: General Motors Corporation, Detroit, Mich.

[21] Appl. No.: 254,500

[22] Filed: Apr. 15, 1981

[51] Int. Cl.³ ............................................. B60R 21/10
[52] U.S. Cl. .................................... 280/802; 280/808; 24/196
[58] Field of Search ............... 280/802, 808, 801, 803, 280/804, 806, 807; 24/196

[56] References Cited

U.S. PATENT DOCUMENTS 4,262,932  4/1981  Motonami ........................... 280/802
4,268,067  5/1981  Thomas ............................... 280/802
4,310,177  1/1982  Rogers, Jr. et al. ................ 280/802

Primary Examiner—Robert R. Song
Attorney, Agent, or Firm—Charles E. Leahy

[57] ABSTRACT

A junction device is connected to an anchor belt retractably mounted inboard an occupant seat and slidably encircles a continuous-loop belt having upper and lower ends mounted on the door to define lap and shoulder belt portions. A yieldable spring, preferably a rubber O-ring, is sewn to the anchor belt and hooked over the junction device to establish the junction device at a normal angular position relative the anchor belt in which the junction device assumes a streamlined lie-flat position with respect to the occupant torso to thereby facilitate low interference travel of the junction device across the occupant torso during movement of the door from the closed position to the open position.

3 Claims, 5 Drawing Figures

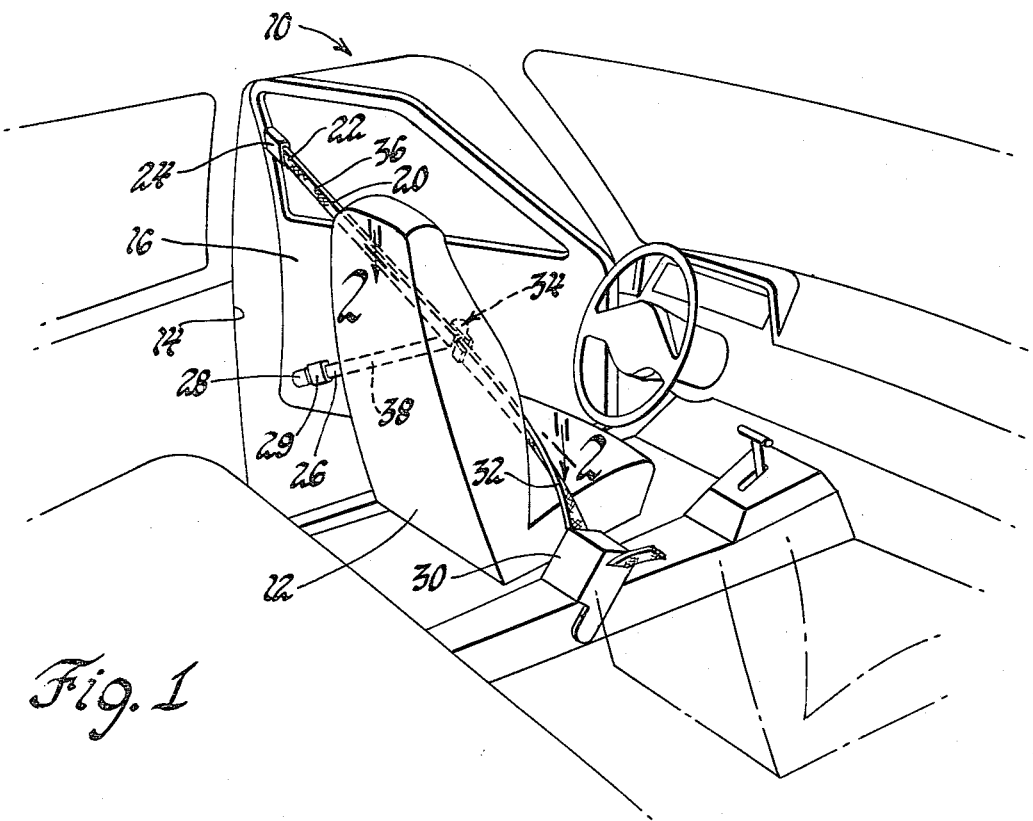
Fig. 1
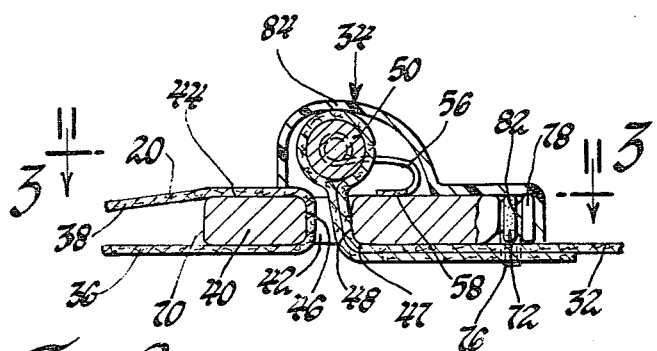
Fig. 2
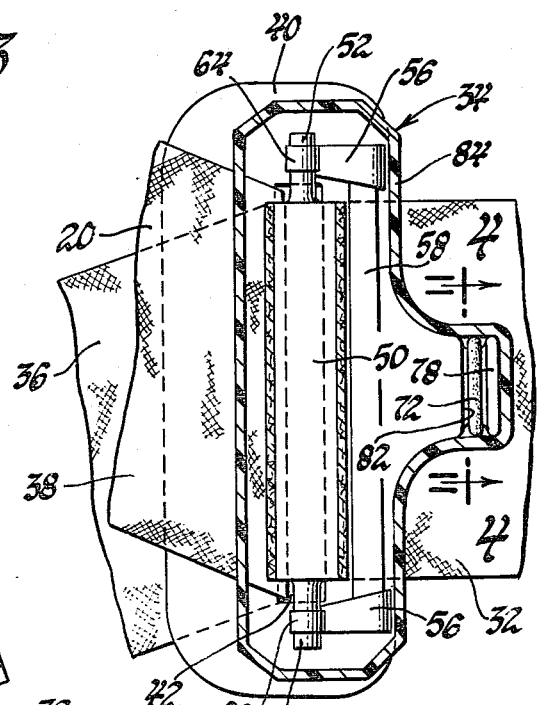
Fig. 3
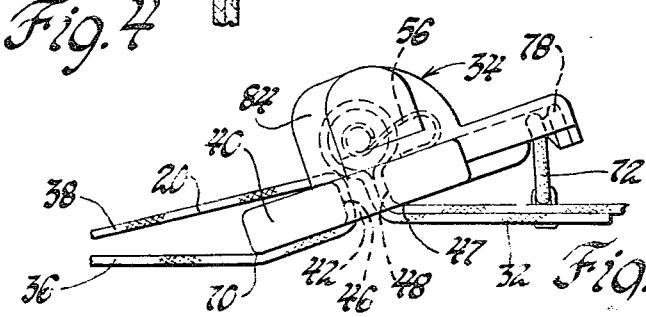
Fig. 4
Fig. 5

JUNCTION RING FOR CONTINUOUS-LOOP PASSIVE SEAT BELT SYSTEM

The invention relates to a locking junction ring for joining a door mounted continuous-loop lap and shoulder belt with a retractably mounted anchor belt to provide a passive belt system and more particularly to provide an improved junction ring for low interference travel across the occupant torso during opening and closing of the door.

BACKGROUND OF THE INVENTION

It is well known in motor vehicles to restrain an occupant in the seat by a lap belt disposed across the lap and a shoulder belt disposed diagonally across the chest.

It is also known to provide a passive lap and shoulder belt system wherein the outboard ends of the continuous-loop belt are mounted on the vehicle door. The inboard anchor belt end is retractably mounted on the vehicle body inboard the seat and the outboard anchor belt end is connected to the continuous-loop by a junction ring which is slidable along the continuous-loop to divide the loop into varied length lap belt and shoulder belt portions to fit the particular seated occupant.

U.S. patent application Ser. No. 57,605 by Lloyd W. Rogers, filed July 16, 1979, now U.S. Pat. No. 4,310,177 discloses a load locking junction device for coupling a continuous-loop belt having ends mounted on the vehicle door with an anchor belt retractably mounted at the inboard side of the occupant seating position. The junction device includes a frame having a central elongated aperture defining spaced apart first and second elongated load bearing walls. The continuous-loop belt is slidable over the first wall to divide the continuous-loop belt into a lap belt portion and a shoulder belt portion. The anchor belt extends through the aperture and has a pin engaged in the end thereof to enlarge the anchor belt end portion for simultaneous engagement against the second wall and the continuous-loop belt so that the belts are coupled together and maintained in engagement with the load bearing walls against migration toward the ends of the elongated aperture. A spring acts between the frame and the pin to normally hold the anchor belt in spaced relation from the continuous-loop belt and thereby permit free adjusting movement of the continuous-loop belt through the frame. The imposition of oppositely directed occupant restraining loads on the continuous-loop belt and the anchor belt during emergency induced vehicle deceleration causes the enlarged anchor belt end portion to forcefully clamp the continuous-loop belt against the frst load bearing wall whereby the restraining lengths of the lap belt and shoulder belt portions are fixed relative one another.

A characteristic of the aforedescribed junction device is that the resolution of forces imposed upon the frame by the anchor belt in one direction and the lap belt and shoulder belt portions of the continuous-loop bent in the opposite direction cause the frame to tilt to an angular position in which a corner of the frame tends to catch on the clothing of the seat occupant during travel of the junction device across the occupant upper torso during opening movement of the door.

SUMMARY OF THE INVENTION

The object, feature and advantage of the invention resides in the provision of a yieldable spring acting between the frame of the junction device and the anchor belt to establish the frame member at a normal angular position relative the anchor belt in which the junction device assumes a streamlined lie flat position with respect to the occupant torso to thereby facilitate low interference travel of the junction device across the occupant during movement of the door between the open and closed positions.

The yieldable spring, preferably an O-ring, is sewn to the anchor belt and engaged over a hook portion of the junction device frame. The O-ring spring holds the frame flat against the anchor belt but yields upon an imposition of occupant restraint loads upon the belt system so that the frame is permitted to assume an angular position providing optimum restraint effectiveness by locking the continuous-loop belt against movement through the junction device.

DESCRIPTION OF THE DRAWINGS

These and other objects, features and advantages of the invention will become apparent on consideration of the description of the preferred embodiment, and the appended drawings in which:

FIG. 1 is a perspective view of a vehicle body showing a passive seat belt system having a locking junction ring according to the invention;

FIG. 2 is a view taken in the direction of arrows 2—2 of FIG. 1 and showing the junction ring frame connected to the control belt by a yieldable O-ring spring so that the junction ring device is streamlined for low interference travel across the torso of seated occupant;

FIG. 3 is a plan view of the junction ring device taken in the direction of arrows 3—3 of FIG. 2;

FIG. 4 is a sectional view taken in the direction of arrows 4—4 of FIG. 3; and

FIG. 5 is a view corresponding to FIG. 2 but showing yielding of the O-ring spring upon imposition of occupant restraint load on the restraint belt.

DESCRIPTION OF THE PREFERRED EMBODIMENT

Referring to FIG. 1 there is shown a vehicle body 10 having a seat 12 located laterally adjacent a door opening 14. A door 16 is hingedly mounted on the vehicle body 10 for swinging movement between an open opposite shown in FIG. 1 and a closed position.

A three-point continuous-loop passive occupant restraint system for restraining an occupant in the seat 12 includes a continuous-loop belt 20 having an upper end 22 attached to the upper rear corner of the door by an anchor plate 24 and a lower end 26 attached to the lower rear corner of the door by an anchor plate 28. A disconnect buckle 29 is interposed in the belt 20 adjacent the anchor plate 28.

An anchor belt 32 has an inboard end which is retractably mounted by a retractor 30 suitably mounted on the vehicle 10 inboard the occupant seating position. The retractor 30 is preferably of the vehicle inertia sensitive type having a lockbar which is engaged with a belt reel by a pendulum or other inertia responsive member upon the occurrence of a predetermined level of vehicle deceleration.

A junction ring assembly 34 is attached to the outboard end of the anchor belt 32 and slidably encircles the belt 20 to define a shoulder belt portion 36 and a lap belt portion 38.

Referring to FIGS. 2 and 3, it is seen that the junction ring assembly 34 is comprised of a ring-like frame member 40 of stamped steel construction having an elongated central belt receiving aperture 42 which defines a first belt load bearing wall 46 which is slidably engaged by the continuous-loop belt 20 and a second load bearing wall 48 at the other side of the belt receiving aperture 42 which is slidably engaged by the outboard end of the anchor belt 32.

As best seen in FIG. 2, the anchor belt 32 passes through the belt receiving aperture 42, is looped about a pin 50, and returns through the aperture 42. The anchor belt 32 is stitched to itself so that the pin 50 is captured therein as seen in FIG. 2. As best seen in FIGS. 4 and 5, the pin 50 has reduced diameter end portions 52 and 54 which extend laterally beyond the end walls of the aperture 42. A leaf spring 56 of stamped steel includes a base 58 which is attached to the frame member 40 and has laterally spaced spring legs 64 and 66 which respectively encircle and engage the end portions 52 and 54 of pin 50 to normally establish the pin 50 at its position of FIG. 2 in which the anchor belt 32 is held in spaced relation away from engagement with the continuous-loop belt 20.

Referring again to FIG. 1, it will be understood that inboard swinging movement of the door 16 from the open position to the closed position moves the belt anchorages 24 and 28 adjacent the outboard occupant shoulder and the outboard occupant hip. Simultaneously, the retractor 30 winds the anchor belt 32 to establish the junction ring assembly 34 adjacent the inboard hip. Accordingly, the shoulder and lap belt portions of the continuous-loop belt 20 are established in their respective restraining positions across the body of the vehicle occupant.

It will be understood that the effort of the leaf spring 56 is greater than the retracting effort of the retractor 30 so that the pin 50 will hold the anchor belt 32 in spaced relation away from engagement with the continuous-loop belt 20. Accordingly, the continuous-loop belt 20 may pass freely through the junction ring assembly 34 in either direction as necessary to adjust the relative lengths of the shoulder and lap belt portions to facilitate occupant ingress and egress, to facilitate movement of the occupant within the seat, and to fit the size of a particular seated occupant.

Referring to FIG. 5, there is shown a view of the junction device with the frame member 40 tilted to an angular position with respect to the anchor belt 32. This angularly tilted position is the result of the forces imposed on the frame member 40 by the shoulder belt portion 36, the lap belt portion 38 and the anchor belt 32. In particular, even though the winding effort of the retractor 30 imposed on the belts is relatively small, the anchor belt load acts upon the frame member 40 at the lower corner 48 of the load bearing wall 47 and causes the frame member 40 to tilt upwardly to the position shown in FIG. 5.

Referring again to FIG. 1, it will be appreciated that because the shoulder belt portion 36 diverges upwardly from the junction ring 34 and the lap belt portion 38 diverges downwardly, the corner 70 of the junction ring frame member 40 will be exposed for contact with the clothed torso of the seated occupant. Accordingly, and particularly during outward travel of the junction ring device with the belt during opening movement of the door, the corner 70 of the junction ring drags across the clothing of the seated occupant and tends to snag on the clothing.

Referring again to FIG. 2, it is seen that a yieldable spring arrangement is provided between anchor belt 32 and the frame member 40. In particular, referring to FIG. 3, it is seen that a commercially available rubber O-ring 72 is attached to the anchor belt 32 by sewn threads 76. The O-ring 72 is stretched into engagement over a hook portion 78 of the frame member 40 and seats within a groove 82 thereof. Accordingly, the O-ring 72 acts as a spring to retain the junction ring device at the streamlined in-line position of FIG. 2 with respect to the anchor belt 32 as well as the lap and shoulder belt portions of the continuous-loop belt.

Upon occurrence of a predetermined level of vehicle deceleration, the retractor 30 locks the length of the anchor belt 32 so that forward movement of the occupant is restrained by the shoulder and lap belt portions. The occupant restraining loads are transferred to the junction ring assembly 34 in the outboard direction by the shoulder and lap belt portions and in the inboard direction by the anchor belt 32. The leaf spring 56 yields when the belt load reaches a predetermined level so that the anchor belt 32 is carried into clamping engagement with the continuous-loop belt 20 as seen in FIG. 3 to lock the continuous-loop belt against travel through the junction ring and thereby fix the relative lengths of the lap and shoulder belt portions.

Referring to FIG. 5, it is seen that upon the imposition of occupant restraint load, the increased level of force imposed upon the anchor belt 32, the shoulder belt portion 36 and the lap belt portion 38 induces angular pivoting movement of the junction ring device to the position of FIG. 5 as the locking junction ring functions to lock the continuous-loop belt against transference through the junction ring and thereby provide optimum restraint effectiveness.

A molded plastic cover 84 is attached to the frame member 40 and conceals the frame, the pin 50 and spring 56.

Thus, it is seen that the invention provides a new and improved junction ring assembly for connecting a continuous-loop belt with an anchor belt in a manner which positions the junction ring device at a streamlined in-line position to prevent interference of the junction ring with the seat occupant's clothing during opening movement of the door.

The embodiments of the invention in which an exclusive property or privilege is claimed are defined as follows:

1. In vehicle seat belt system including a continuous-loop belt having ends mounted on the vehicle door, an anchor belt having an inboard end mounted inboard the occupant seat and an outboard end, and a junction device connected to the outboard end of the anchor belt and slidably encircling the continuous-loop belt to define variable length lap and shoulder belt portions thereof, the improvement comprising:
   yieldable means acting between the junction devide and the anchor belt to establish the junction device at a normal angular position relative the anchor belt to streamline the junction device for low interference travel across the occupant torso during opening and closing movement of the door, said yieldable means being yieldable upon imposition of oppositely directed occupant restraint loads on the continuous-loop belt and anchor belt whereby the junction device is permitted to seek an angular position providing optimum occupant restraint effectiveness.

2. In combination with a vehicle seat belt system including a continuous-loop belt having ends mounted on the vehicle door and an anchor belt having a first end mounted inboard the occupant seating position and a second end;
- junction means connected to the second end of the anchor belt and slidably encircling the continuous-loop belt to define variable length lap and shoulder belt portions thereof;
- locking means associated with the junction means and adapted to lock the continuous-loop belt against sliding movement therethrough in response to imposition of occupant restraint load thereon; and
- yieldable spring means acting between the junction means and the anchor belt to establish the junction means at a normal angular position relative the anchor belt to streamline the junction device for low interference travel across the occupant torso during opening and closing movement of the door, said spring means being yieldable upon imposition of oppositely directed occupant restraint loads on the continuous-loop belt and anchor belt whereby the junction device is permitted to seek an angular orientation providing optimum occupant restraint effectiveness.

3. In combination with vehicle seat belt system including a continuous-loop belt having ends mounted on the vehicle door and an anchor belt having a first end mounted inboard the occupant seating position and a second end, a junction device adapted to couple the second end of the anchor belt with the continuous-loop belt, said junction device comprising:
- a ring-like frame member having an elongated central belt receiving aperture defining a first belt load bearing wall adapted for sliding engagement by continuous-loop belt and a second load bearing wall for engagement by the anchor belt second end;
- said anchor belt second end being enlarged to prevent passage of the anchor belt second end through the frame member so that the continuous-loop belt and the anchor belt are effectively coupled; and
- a resilient yieldable O-ring spring attached to the anchor belt connected to the frame member to establish the frame member at a normal angular position relative the anchor belt in which the junction device is streamlined to facilitate passage across the occupant torso, said spring means being yieldable upon imposition of occupant restraint loads so that the frame member is freed to assume an angular position providing optimum restraint effectiveness.

* * * * *